United States Patent [19]

Aiki et al.

[11] Patent Number: 4,793,688
[45] Date of Patent: Dec. 27, 1988

[54] PHOTO ELECTRO DEVICE, METHOD FOR MANUFACTURE OF SAME, AND LENS SUPPORT FRAME FOR USE IN SUCH PHOTO ELECTRO DEVICE

[75] Inventors: Kunio Aiki; Atsushi Sasayama; Tugio Nemoto, all of Komoro; Tsunetoshi Kawabata, Tamamura; Haruo Kugimiya, Komoro, all of Japan

[73] Assignees: Hitachi Ltd.; Hitachi Tobu Semiconductor, Ltd., both of Tokyo, Japan

[21] Appl. No.: 53,481

[22] Filed: May 26, 1987

[30] Foreign Application Priority Data

May 26, 1986 [JP] Japan .................... 61-119239

[51] Int. Cl.[4] ............................. G02B 7/02
[52] U.S. Cl. ............................. 350/252; 350/320; 350/416; 350/96.18
[58] Field of Search .............. 350/252, 245, 236, 165, 350/243, 416, 500, 96.15, 96.17, 96.18, 96.20, 320

[56] References Cited

U.S. PATENT DOCUMENTS

| 3,606,522 | 9/1971 | Townes et al. | 350/252 |
| 3,620,603 | 11/1971 | White et al. | 350/416 |
| 3,950,075 | 4/1976 | Cook et al. | 350/416 |
| 4,257,672 | 3/1981 | Balliet | 350/96.18 |
| 4,433,898 | 2/1984 | Nasiri | 350/96.17 |
| 4,610,746 | 9/1986 | Broer et al. | 350/96.15 |

OTHER PUBLICATIONS

"Nikkei Mechanical", pp. 68–77, Nikkei McGraw-Hill Co., Jul. 5, 1982.
"Hitachi Review", No. 10, pp. 39–44, Hitachi Review Co., Oct. 25, 1983.
"Hitachi Review", No. 10, pp. 35–39, Hitachi Review Co., Oct. 25, 1985.
"Electronic Material", pp. 94–100, Industrial Research Association, Nov. 1, 1983.

Primary Examiner—John K. Corbin
Assistant Examiner—Loha Ben
Attorney, Agent, or Firm—Antonelli, Terry & Wands

[57] ABSTRACT

In the photo electro device, a laser diode chip is set fixedly through a submount to a heatsink in a package. In assembling, first a ball lens is anchored to a holder of a lens support frame by clinching claws of the holder. Subsequently the surfaces of the ball lens on the obverse and reverse sides of the lens support frame are coated with nonreflective films. Then the position of the lens support frame is adjusted relatively to the laser diode chip so that the respective optical axes are aligned with each other. And after an arm is welded fixedly to the heatsink, a frame member is severed or removed to complete the work for setting the ball lens.

8 Claims, 4 Drawing Sheets

PHOTO ELECTRO DEVICE, METHOD FOR MANUFACTURE OF SAME, AND LENS SUPPORT FRAME FOR USE IN SUCH PHOTO ELECTRO DEVICE

BACKGROUND OF THE INVENTION

1. Field of the Invention

The present invention relates to a photo electro device designed for condensing, through a lens, laser light emitted from a laser diode or the like and transmitting the light to a desired optical system. It also relates to a method of manufacturing such a device and further to a lens support frame for use therein.

2. Description of the Prior Art

There are employed semiconductor laser elements (laser diode chips) of various structure as light sources for light communication equipment or data processors using digital audio discs, video discs and so forth.

Relative to such photo electro devices with a laser diode chip incorporated therein, the following conventional structures are known for guiding laser light to the outside of a package. In the simplest structure, laser light emitted from a laser diode chip is transmitted directly to the outside of a package, as described in "Nikkei Mechanical", Nikkei McGraw-Hill Co., July 5, 1982, pp. 68–77.

In another structure, laser light is advanced directly into an optical fiber, as described in "Hitachi Review", Hitachi Review Co., No. 10, Oct. 25, 1983, pp. 39–44. According to this example, laser light emitted from a laser diode chip is introduced into an optical fiber and is guided therethrough to the outside of a package. There is also known a structure using a lens, as disclosed in "Hitachi Review", Hitach Review Co., No. 10, Oct. 25, 1985, pp. 35–39. In this structure, laser light emitted from a laser diode chip is once condensed via a ball lens and then is guided to an optical fiber. Furthermore, as an exemplary light emitting diode (LED) with a lens, there is disclosed a technique in "Electronic Material", Industrial Research Association, No. 11, Nov. 1, 1983, pp. 94–100. According to this device, light emitted from an LED chip is condensed via a ball lens or a rod lens incorporated in a package and having an optical refractive index distribution in its radial direction, and then the light is guided to an optical fiber connected to the package.

SUMMARY AND OBJECTS OF THE INVENTION

Relative to the structure where light emitted from a laser diode chip or LED chip is effectively coupled to an optical system such as optical fiber, as disclosed in the cited references, there is known a technique of using a micro ball lens smaller than 1 mm in diameter. However, there exist some operational difficulties in positioning and setting such small lens. Particularly in the case of a laser diode chip where a light emitting region is extremely small and the divergence angle of the laser light beam is narrow, advanced technique is required in comparison with the LED chip. When setting such micro ball lens by the use of a bonding material, it becomes necessary to metalize the connecting portion of the ball lens for bonding the same. Meanwhile in the case of a semiconductor laser where noise is induced by return light, both surfaces of the ball lens need to be coated with nonreflective films, but it raises a problem that the operational efficiency is extremely low.

It is an object of the present invention to provide a photo electro device wherein a high optical coupling efficiency is attainable.

Another object of the invention is to provide a technique for facilitating optical axis alignment in manufacture of a photo electro device.

A further object of the invention is to provide a technique for reducing the production cost in manufacture of a photo electro device.

And an even further object of the invention is to provide a lens support frame for use in a photo electro device wherein a high precision is achievable with respect to optical axis alignment of a laser diode chip and a lens while ensuring easy attachment of the lens.

The foregoing and other objects of the invention and the novel features thereof will become apparent from the description given hereinafter in the specification and the accompanying drawings.

Of the inventions disclosed in this specification, typical ones are summarized as follows.

In the photo electro device according to the present invention, a laser diode chip is set fixedly through a submount to a heatsink in a package. In assembling, first a ball lens is anchored to a holder of a lens support frame by clinching claws of the holder. Subsequently the surfaces of the ball lens on the obverse and reverse sides of the lens support frame are coated with nonreflective films. Then the position of the lens support frame is adjusted relatively to the laser diode chip so that the respective optical axes are aligned with each other. And after an arm is welded fixedly to the heatsink, a frame member is severed or removed to complete the work for setting the ball lens.

According to the means mentioned above, since the ball lens is coated with nonreflective films after being anchored to the lens support frame, it becomes possible to facilitate the step of nonreflective coating. The optical axis alignment between the ball lens and the laser diode chip can be executed by the relative positional adjustment of the lens support frame to the laser diode chip, and the ball lens is set fixedly by welding the arm of the lens support frame, so that satisfactory operational progress is ensured with achievement of a high efficiency in optical coupling. Furthermore, since the arm for holding the ball lens is composed of a deformable material, the position of the ball lens can be corrected, if necessary, by deforming the arm after anchoring the lens support frame to the heatsink, whereby a high precision is attainable with respect to the optical axis alignment in manufacture of the photo electro device.

DESCRIPTION OF THE PREFERRED EMBODIMENTS

Hereinafter an exemplary embodiment of the present invention will be described with reference to the accompanying drawings.

Figure 1:
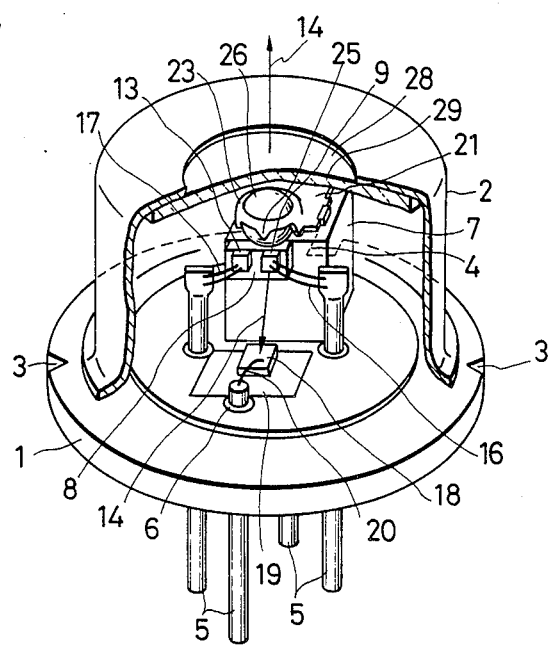
FIG. 1 is a partially cutaway perspective view of an exemplary photo electro device embodying the present invention.
Figure 2:
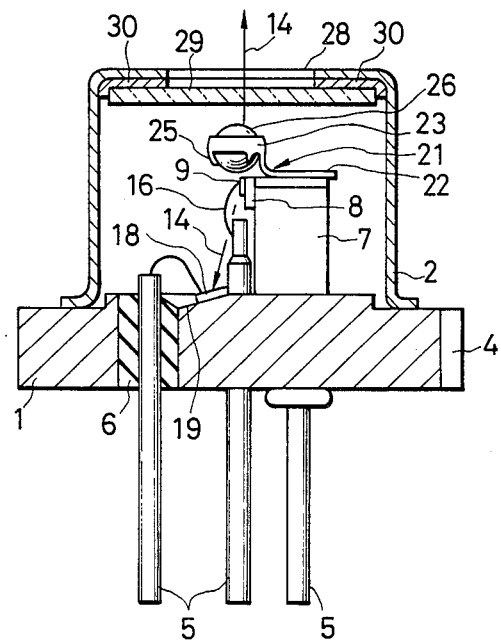
FIG. 2 is a sectional view of the photo electro device shown in FIG. 1.

As illustrated in FIG. 1, the photo electro device of the invention comprises a plate-shaped stem 1 and a cap 2 serving as principal components of the assembly, wherein the cap 2 is fixed in an airtight manner to the main surface of the stem 1. Such stem 1 and cap 2 constitute a package of the photo electro device. The stem 1 is composed of a circular metallic plate with a thin peripheral edge of several millimeters in thickness and has, in such peripheral edge, guides including V-shaped notches 3 and a rectangular recess 4 used for positioning and directional discrimination at the time of assembly. As shown in FIGS. 1 and 2, four leads 5 are connected to the stem 1. One lead 5 is anchored to the reverse surface of the stem 1 both electrically and mechanically, while the other three leads 5 pierce through the stem 1 and are anchored thereto in an electrically insulated state via an insulator 6 such as glass.

Figure 4:
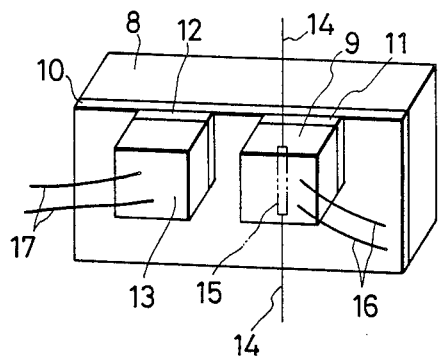
FIG. 4 is a perspective view illustrating a state where a laser diode chip and so forth are set in the photo electro device of FIG. 1.

Meanwhile, as shown in FIG. 1, a heatsink 7 is fixed at the center of the main surface of the stem 1 by the use of solder or the like. Both the heatsink 7 and the stem 1 are composed of a metal of high heat conductivity. And a semiconductor laser element (laser diode chip) 9 is anchored via a submount 8 to one lateral surface of the fore end of the heatsink 7. The submount 8 is composed of insulating SiC ($\alpha$: $3.7 \times 10^{-6}/°C.$) which has a high heat conductivity with a thermal expansion coefficient $\alpha$ similar to that of silicon Si or compound semiconductor. Furthermore, as shown in FIG. 4, a conductive metalizing layer 10 is formed on the main surface of the submount 8. And the laser diode chip 9 and a pedestal 13 composed of gold Au are anchored on the metalizing layer 10 independently of each other through Pb-Sn layers 11 and 12 respectively. Therefore a lower electrode of the laser diode chip 9 is connected electrically to the pedestal 13 via the metalizing layer 10. As shown in FIG. 4, the laser diode chip 9 is set on the submount 8 in a state where its resonator 15 for emitting laser light 14 is spaced apart from the submount 8 with the P-type region of a PN junction type laser diode turned upward. Meanwhile an upper electrode of the laser diode chip 9 is connected electrically to the lead 5 through two wires 16, and the pedestal 13 is connected electrically to the lead 5 through two wires 17 as shown in FIG. 2. The laser diode chip 9 is anchored to the heatsink 7 while being retained on the submount 8.

The stem 1 is equipped with, on its main surface, a light sensitive element 18 which receives the laser light 14 emitted from the lower end of the laser diode chip 9 and thereby monitors the output laser light 14. The light sensitive element 18 is fixed by the use of an unshown bonding material on a slope 19 formed on the main surface of the stem 1. Since the surface of the light sensitive element 18 is inclined due to its setting on the slope 19, the laser light 14 emitted from the laser diode chip 9 and reflected at the surface of the light sensitive element 18 is not incident on a window of an undermentioned cap 2, whereby no disorder is induced in the far-field pattern of the semiconductor laser. The upper electrode of the light sensitive element 18 is connected electrically to the lead 5 by means of a wire 20.

Figure 7:
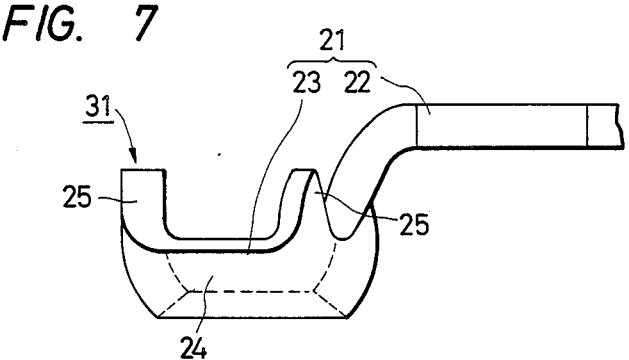
FIG. 7 is an enlarged side view of a lens support frame where a ball lens is anchored.
Figure 8:
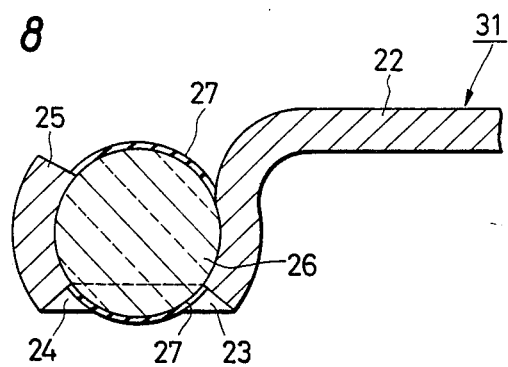
FIG. 8 is an enlarged sectional view of a lens and a lens support frame.

As another feature of the present invention, a lens holder 21 forming a portion of the lens support frame is anchored to the top end of the heatsink 7. The lens support frame or the lens holder 21 is composed of a deformable metallic plate and consists of a thin arm 22 and a holding member 23 disposed at one end of such arm 22, as shown in FIG. 7. The holding member 23 comprises a ring 24 and three claws 25 projecting from one peripheral edge of the ring 24, wherein the ball lens 26 is supported by the ring 24 as shown in FIG. 8. The claws 25 are clinched inward so as to prevent the ball lens 26 from sliping out of the ring 24. The surface of the ball lens 26 exposed from the lens holder 21 for transmission of the laser light 14 therethrough is coated with a nonreflective film 27. Such lens holder 21 is anchored to the heatsink 7 with its arm 22 welded to the heatsink 7.

A metallic cap 2 having a window 28 is fixed airtightly to the main surface of the stem 1, thereby sealing both the laser diode chip 9 and the heatsink 7. And a transparent glass sheet 29 is attached to the window 28 via a joint 30. Accordingly the laser light 14 emitted from the top end of the leaser diode chip 9 and condensed by the ball lens 26 is transmitted through the transparent glass sheet 29 and then is irradiated to the outside of the package which is constituted by a combination of the stem 1 and the cap 2.

In such photo electrode device, the position of the holding member 23 supporting the ball lens 26 therein is adjustable, after assembling, with facility and certainty by deforming the arm 22 which sustains the holding member 23. Consequently it becomes possible in the photo electro device to achieve satisfactory optical coupling between the ball lens 26 and the laser diode chip 9.

In such photo electro device where the surface of the ball lens 26 for transmission of the laser light 14 therethrough is coated with a nonreflective film 27, there never occurs a phenomenon that the laser light 14 is reflected by the ball lens 26 and returned to the laser diode chip 9, whereby generation of noise can be suppressed.

Now a description will be given on a method for manufacture of the photo electro device mentioned above.

Prior to final assembling of the photo electro device, there are prepared a stem assembly unit consisting principally of a stem 1, a lens support frame assembly unit with a ball lens 26 attached, and a cap assembly unit with a glass sheet 29 attached.

Figure 3:
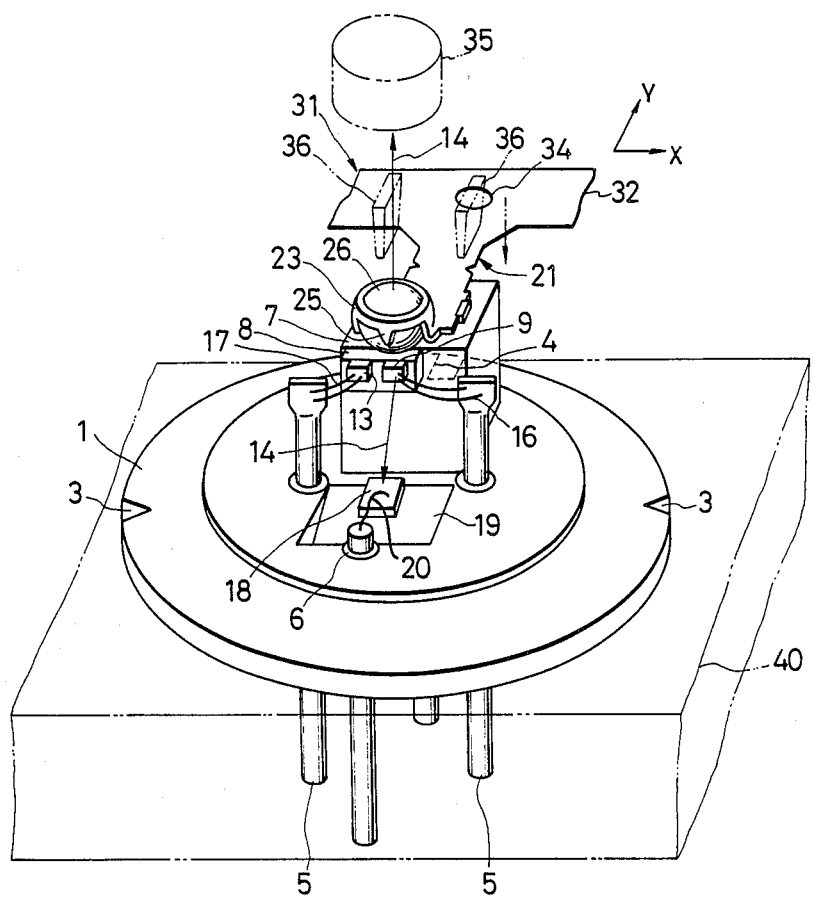
FIG. 3 is a perspective view illustrating how the photo electro device of FIG. 1 is manufactured.

In the stem assembly unit, as shown in FIG. 3, leads 5 and a heatsink 7 are anchored to the stem 1. Furthermore a laser diode chip 9 and a submount 8 with a pedestal 13 set thereon are fixed to the heatsink 7, and a light sensitive element 18 is anchored on the main surface of the stem 1. In such stem assembly unit, the leads 5 are connected electrically to predetermined positions of the laser diode chip 9, pedestal 13 and light sensitive element 18 by means of wires 16, 17 and 20.

Figure 5:
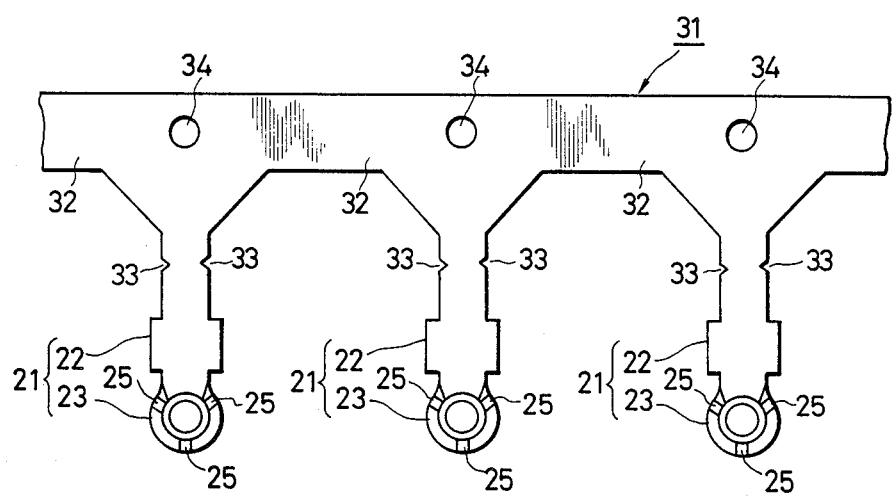
FIG. 5 is a plan view of a lens support frame for use in assembling the photo electro device of FIG. 1.
Figure 6:
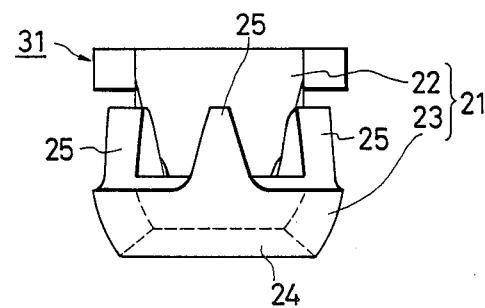
FIG. 6 is an enlarged front view of a lens support frame employed in the photo electro device of FIG. 1.

In the lens support frame assembly unit, as shown in FIG. 3, a ball lens 66 is set fixedly in a holding member 23 of a lens support frame 31. And the surface of the ball lens 26 exposed from the lens support frame 31 for transmission of the laser light 14 therethrough is coated, as shown in FIG. 8, with a nonreflective film 27 which serves to prevent reflection of the light. The lens support frame 31 comprises, as shown in FIG. 5, a frame member 32 extending linearly, a plurality of arms 22 (here, merely a single arm 22 is illustrated) extending from one side of the frame member 32, and a holding member 23 disposed at the fore end of the arm 22. The arm 22 is shaped to be wider in the base portion of the frame member 32 so as not to be bent with ease. Meanwhile in mid portions of the arm 22, V-shaped notches 33 are formed on the two sides to partially narrow the arm 22. Such notches are effective to achieve ready severance or breaking when the lens holder 21 consisting of the arm 22 and the holding member 23 is severed from the frame member 32. As shown in FIGS. 6 and 7, the holding member 23 comprises a ring 24 and claws 25 which are arrayed at an angular interval of 120° and extend from one side of the ring 24. The fore end of the arm 22 is bent in one direction while the ring 24 is drawn inward so that, as shown in FIG. 8, the ball lens 26 can be supported by the ring 24. After the ball lens 26 is received in the ring 24, the claws 25 are clinched to hold the ball lens 26 tight from the periphery, thereby setting the ball lens 26 firmly to inhibit rotation or displacement.

The nonreflective film 27 partially coating the ball lens 26 is formed after tee ball lens 26 is set in the lens support frame 31. That is, posterior to setting of the ball lens 26 in the lens support frame 31, one lens surface on the obverse side of the lens support frame 31 is coated with a nonreflective film 26 by evaporation or the like, subsequently the lens support frame 31 is inverted, and then the other lens surface on the reverse side of the lens support frame 31 is coated with a nonreflective film 27 by evaporation or the like again. Such procedure for coating the ball lens 26 with nonreflective films 27 can be carried out with facility as the ball lens 26, which is spherical and therefore prone to roll, is set unmovably in the lens support frame 31, and another effect is also attainable that the nonreflective film 27 can be formed in any desired region of the lens. In the frame member 32 of the lens support frame 31, there are formed guide holes 34 to be utilized for positioning the lens support frame 31 and so forth.

Although not illustrated in particular, the aforementioned cap assembly unit is so constituted that, as shown in FIGS. 1 and 2, a glass sheet 29 is attached airtightly to the inner ceiling of the cap 2 by means of a joint 30 and thereby closes a window 28 of the cap 2.

When fabricating the photo electro device by the use of such assembly units, the lens support frame 31 is disposed on the heatsink 7 in a state where, as shown in FIG. 3, the stem 1 is mounted on a table 40 and is thereby stabilized positionally to facilitate the fabrication. In this step, the rear end portion of the arm 22 of the lens support frame 31 is placed on the top surface of the heatsink 7. And in such a state, the optical axis of the ball lens 26 positioned above the laser diode chip 9 is aligned with that of the laser diode chip 9. The optical axis alignment is executed by first driving the laser diode chip 9 to emit laser light 14 therefrom, then detecting by a detector 35 the laser light 14 transmitted through the ball lens 26, and setting the ball lens 26 at a position where the intensity of the laser light 14 obtained from the detector 35 becomes maximum. In this procedure, the ball lens 26 can be positionally adjusted by displacing the lens support frame 31.

Under the condition that the light intensity in the detector 35 is maximum, the rear end portion of the arm 22 is welded to the heatsink 7 by means of a welding electrode 36 as illustrated in FIG. 3.

Subsequently the frame member 32 of the lens support frame 31 is removed. Although a cutter may be used for such removal, the frame member 32 can be easily broken by repeated vertical bend since its width is as small as several millimeters and the portion to be severed is narrowed for causing ready concentration of stress.

After termination of setting the lens support holder 21 which consists of the arm 22 and the holding member 23, the laser light 14 is detected again by the detector 35 to confirm the light intensity and, if the detected intensity is lower than the maximum, the arm 22 retaining the ball lens 26 is deformed to adjust the position of the ball lens 26.

In the next step, the cap assembly unit is superposed on the stem assembly unit, and the peripheral edge of the cap 2 is fixed airtightly to the stem 1 by welding so that the photo electro device shown in FIGS. 1 and 2 is produced.

In assembling such photo electro device, the ball lens 26 is anchored to the heatsink 7 while being retained in the lens support frame 31, so that the operational facility is remarkably enhanced and, due to the positional adjustment of the ball lens 26 effected by displacing the lens support frame 31, it becomes possible to attain a high precision in the optical axis alignment. Since the arm 22 of the lens support frame 31 is composed of a deformable material, the ball lens 26 can be positionally adjusted by properly deforming the arm even after the ball lens 26 is anchored to the heatsink 7 via the lens holder 21, whereby satisfactory optical coupling is maintained with a high accuracy in the photo electro device. Furthermore, according to the above method for manufacture of the photo electro device, the step of partially coating the ball lens 26 with a nonreflective film 27 is executed after setting the ball lens 26 in the lens support frame 31, hence ensuring sufficient operational facility and enabling exact coating with a nonreflective film.

According to the embodiments mentioned hereinabove, the following effects are achievable.

(1) In manufacture of the photo electro device of the present invention, the lens support frame is used with a ball lens set fixedly therein, so that the ball lens can be handled with ease.

(2) In manufacture of the photo electro device, the ball lens to be disposed opposite to the laser diode chip is anchored, while being supported by the lens holder, to the heatsink where the laser diode chip is fixed. In this step, the lens holder is anchored after positional adjustment of the lens support frame having a lens holding member, so that a high precision is obtained in aligning the optical axis of the ball lens with that of the laser diode chip.

(3) In the photo electro device of the invention where the ball lens is supported by the lens holder as described in item (2), the lens holder comprises a deformable arm and a holding member disposed at the fore end of the arm, and the ball lens is retained in the holding member. Therefore, even after the ball lens is anchored to the heatsink via the lens holder, the lens position can be adjusted by properly deforming the arm of the lens holder, so that the optical axis alignment between the laser diode chip and the ball lens can be executed again to consequently maintain a high optical coupling efficiency.

(4) Coating the ball lens surface with a nonreflective film is carried out after the ball lens is held in the lens support frame, whereby the nonreflective film can be formed in a desired region with certainty.

(5) Since the ball lens surface is coated, due to item (4), with a nonreflective film in the photo electro device of the invention, there occurs no generation of noise that may otherwise result from return of the laser light, and consequently the characteristic can be stabilized.

(6) By virtue of items (1) through (5), the operational facility and the assembling efficiency are enhanced with exact and certain optical axis alignment, hence improving the assembling reproducibility to raise the yield rate and thereby ensuring synergistic effect that the photo electro device can be produced at lower cost with excellent characteristic and high reliability.

Although the present invention has been described specifically hereinabove with reference to a preferred embodiment thereof, it is to be understood that the invention is not limited to such embodiment alone and a variety of modifications may be contrived within the scope not departing from the spirit of the invention. For example, the lens holder for supporting the ball lens is not restricted to the structure employed in the above embodiment. And any other structure is usable on condition that it has a holding member to retain the ball lens and an arm which is deformable as desired and capable of sustaining the holding member.

The foregoing description is concerned principally with an exemplary case of applying the present invention to a photo electro device of a type equipped with a laser diode chip and included in the field of its background art. However, the present invention is not limited to the above alone and is applicable also to a photo electro device of another type which condenses, by the use of a ball lens or the like, the output light of a light emitting element such as LED.

The present invention can be applied at least to a photo electro device constituted for condensing by a lens the output light of a light emitting element and guiding the light to the outside of a package. And it is further applicable to another constitution for condensing the output laser light of a laser diode and transmitting the light by means of optical fiber.

Of the inventions disclosed in this specification, the effects attained by the typical ones will now be briefly mentioned below.

In the photo electro device of the present invention, the ball lens disposed opposite to the laser diode chip anchored via the submount to the heatsink in the package is retained by the holding member of the lens holder and is fixed in a state where one end of the deformable arm of the lens holder is connected to the heatsink. Consequently, fine positional adjustment of the ball lens can be executed by properly deforming the arm of the lens holder even after the ball lens is anchored to the heatsink through the lens holder. Thus, it becomes possible to perform simplified optical axis alignment with a high precision between the laser diode chip and the ball lens. Furthermore the lens holder is sustained by the frame member through the arm prior to being anchored to the heatsink and partially constitutes the lens support frame. Therefore, the optical axis alignment between the laser diode chip and the ball lens can be executed with facility and high precision by displacing the lens support frame relatively to the laser diode chip. Moreover, since the ball lens is set fixedly in the lens support frame as mentioned, the ball lens surfaces on both obverse and reverse sides of the lens support frame can be coated with a nonreflective material in sequence, whereby a desired nonreflective film is easily formable with certainty on each of the ball lens surfaces for transmission of laser light therethrough. By virtue of the above effects attained in the photo electro device of the present invention, optical axis alignment can be performed efficiently with a high precision and, if necessary, such optical axis alignment is repeatable to eventually accomplish improvement in both the reproducibility and the yield rate with reduction of the cost.

What is claimed is:

1. A photo electric device having a light emitting element and a lens for condensing the light emitted from said element, wherein said lens is retained by a lens support holder which includes a lens support frame comprising a frame member, at least one arm extending from said frame member, a ring to receive said lens, said ring being disposed at the fore end of said arm to hold said lens, and bendable claws extending from one peripheral edge of said ring.

2. The device as defined in claim 1, wherein said lens support holder comprises a member for holding said lens, and an arm extending from said holding member and deformable to adjust the position of said lens.

3. The device as defined in claim 1, wherein the surface of said lens for transmission of light therethrough is coated with a nonreflective film.

4. The device as defined in claim 1, wherein said lens is a ball lens.

5. A photo electric device having a package; a laser diode chip incorporated in said package and emitting laser light therefrom; a light sensitive element for receiving the laser light emitted from said chip; and a lens support holder comprising a member for holding a ball lens, an arm extending from said holding member and deformable to adjust the position of said lens in such a manner that said lens retained by said holder is disposed on the laser-light emission line of said laser diode chip, a ring to receive said lens, said ring being disposed at a free end of said arm to hold said lens, and bendable claws extending from one peripheral edge of said ring.

6. The device as defined in claim 5, wherein the surface of said ball lens for transmission of light therethrough is coated with a reflection preventive film.

7. A method for manufacture of a photo electro device having, in a package, a light emitting element and a lens for condensing the light emitted from said element, said method comprising the steps of: setting said lens in a holder of a lens support frame comprising a frame member, at least one arm extending from said frame member, a ring to receive said lens, said ring being disposed at a free end of said arm to hold said lens, and bendable claws extending from one peripheral edge of said ring to engage said lens; aligning the optical axis of said lens with that of said light emitting element by displacing said lens support frame relatively to said light emitting element; and anchoring said lens support frame fixedly.

8. The method as defined in claim 7, further comprising the step of, after setting said lens in the holder of said lens support frame, coating each of the lens surfaces on the obverse and reverse sides of said lens support frame with a nonreflective film.

* * * * *